United States Patent [19]
Butterworth et al.

[11] Patent Number: 4,777,644
[45] Date of Patent: Oct. 11, 1988

[54] METHOD AND APPARATUS FOR TESTING TELEPHONE COIN RELAYS

[75] Inventors: Donald J. Butterworth, Glen Mills, Pa.; Larry Mortimer, Willingboro, N.J.

[73] Assignee: Bell of Pennsylvania, Conshohocken, Pa.

[21] Appl. No.: 62,592

[22] Filed: Jun. 16, 1987

[51] Int. Cl.⁴ ...................... H04M 1/24; H04M 17/00
[52] U.S. Cl. .......................................... 379/1; 379/21; 324/260
[58] Field of Search ............... 379/21, 1, 32; 324/260, 324/263, 179; 340/517

[56] References Cited
U.S. PATENT DOCUMENTS 3,496,300  2/1970  Stokes ............................ 179/6.3
4,582,965  4/1986  Lembke ........................... 379/21

Primary Examiner—Stafford D. Schreyer
Attorney, Agent, or Firm—Lowe, Price, LeBlanc, Becker & Shur

[57] ABSTRACT

A portable tester determines an operating condition of coin relays by sensing a duration of a time period between flux conditions generated thereby. The device does not require electrical circuit connection to the relay and is thus a non-invasive testing apparatus. An annunciator provides audible and visual indications to service personnel to indicate whether the detected duration is too short, requiring one form of adjustment, too long, requiring a second form of adjustment, or within a specified range therefor, requiring no adjustment.

31 Claims, 2 Drawing Sheets

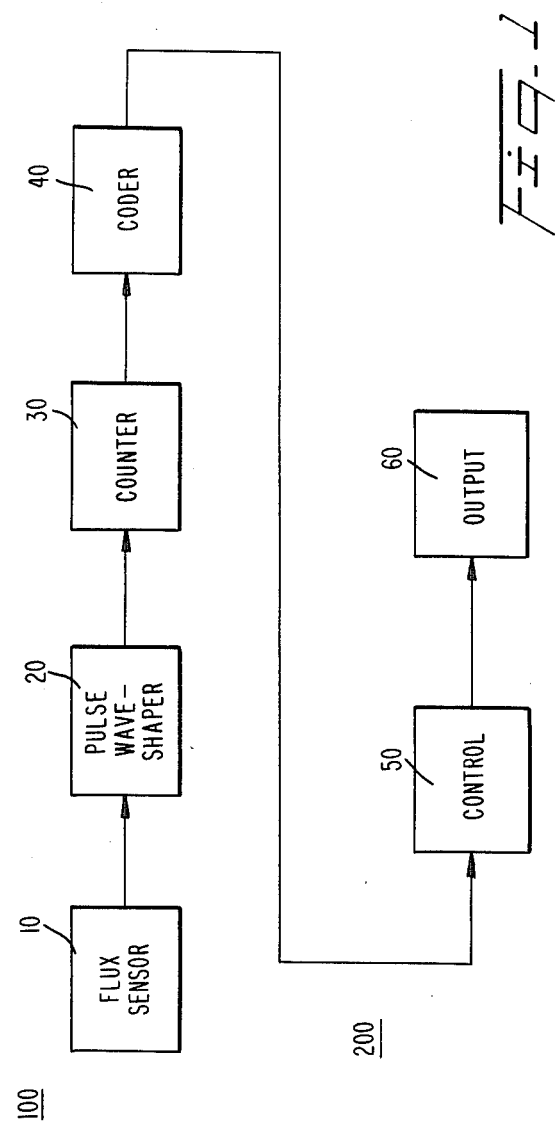

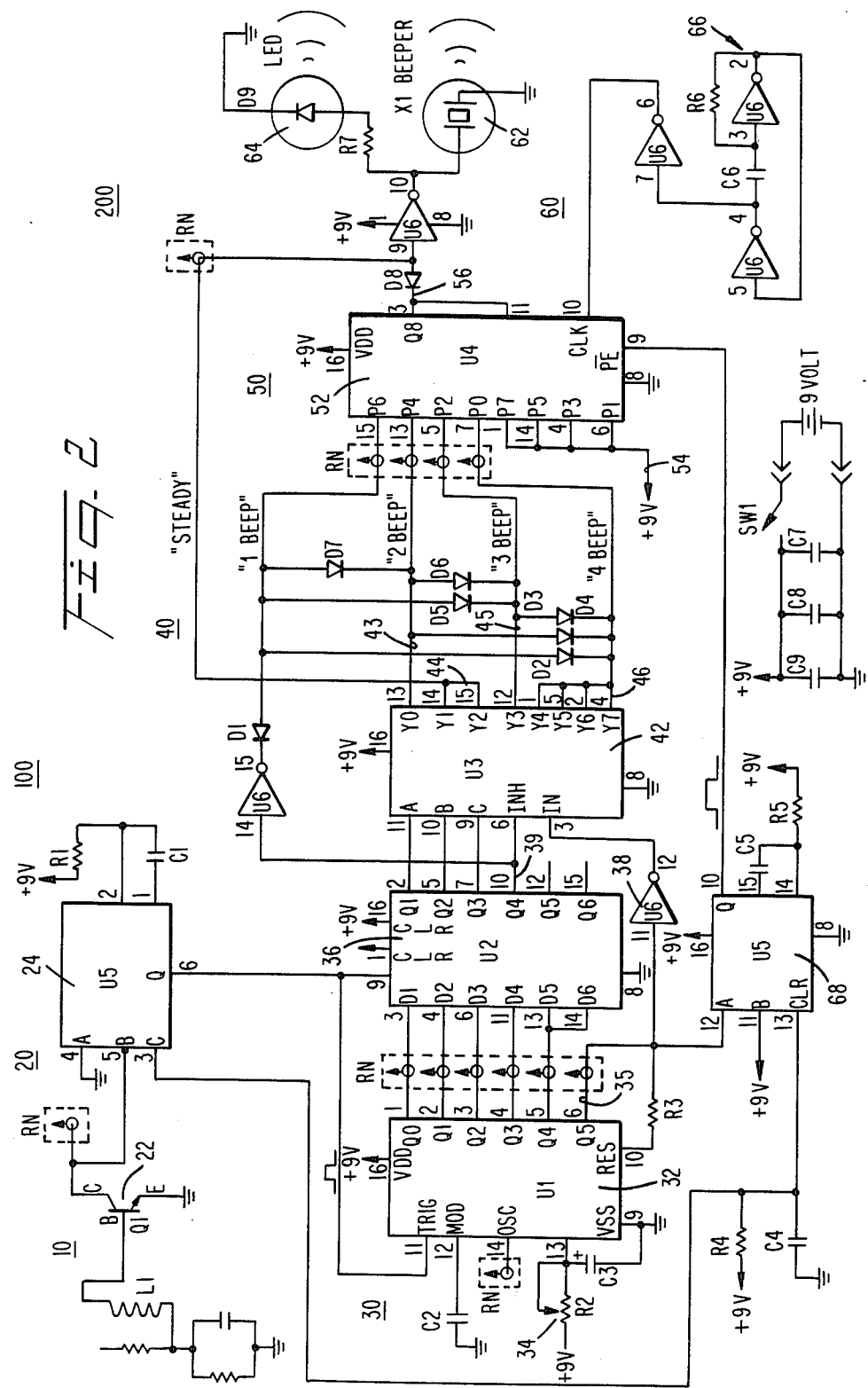

METHOD AND APPARATUS FOR TESTING TELEPHONE COIN RELAYS

FIELD OF INVENTION

This invention relates to relay testers, and more particularly to portable, non invasive, testers for determining a condition of coin relays in coin telephones by determining a time period between two flux conditions generated by the relay under test.

BACKGROUND ART

Typical coin operated telephone units include a mechanism for retaining deposited coins until receipt of a control signal from the central office (CO). As is known to those skilled in the art, the coin mechanism used in coin operated telephone units includes a coin relay, having a resistance of 1020 ohms, for example, a coin sensor and a totalizer. The totalizer closes a switch between the tip line and a circuit including a series connection between a further switch contact operated by the coin sensor and the coin relay. The coin sensor closes the further switch contact upon sensing deposit of a coin. Before the totalizer allows the coin ground to be placed on the tip line, however, the amount of currency represented by the deposited coins must meet or exceed a predetermined "initial rate".

Thus, upon deposit of a coin, both the totalizer and coin sensor operated contacts are closed, completing a circuit between the coin relay and the tip line. The polarity of a 130 V voltage placed on the tip line by the CO determines whether the coin relay energizes a gate mechanism in a coin chute for directing a coin held therein to be collected or to be returned.

In operation, the coin relay generates two conditions of electromagnetic flux. A first condition is generated when the relay is connected to the voltage from the CO, and a second condition is generated when the relay is released from the CO. The first and second conditions correspond to expansion and collapse of the flux generated by the activated relay. However, the flux conditions may similarly refer to first and second flux levels generated by the relay in response to reception of a voltage of a particular polarity from the CO.

The time period between the two flux conditions, particularly between the expansion and collapse of flux generated by the relay coil, is required to be within predetermined limits for proper operation. More particularly, the time between energization and collapse must be sufficiently long to permit all coins to be collected before a gate in the coin chute is closed. If the time is too short, the gate closes too soon and coins may become stuck in the chute.

However, if the time is too long, excessive power is used and the timing specifications of various Electronic Switching Systems may be affected. That is, the CO equipment can only stay on line for no more than a preset period of time to cause return or collection of a coin, since the equipment is charged with performing numerous other tasks. Coin relays in coin operated telephones are thus provided with an adjustment apparatus, typically in the form of an adjustment screw, for adjusting the timing thereof.

Accordingly, it is necessary to maintain the timing of a coin relay within predetermined limits. Thus, proper operation of a relay may be detected by detecting the timing between the two flux conditions generated thereby, and particularly between the expansion and collapse times for the flux fields generated thereby.

In order to test the coin relays for proper operation, a known technique relies on repair personnel accessing the CO via a test trunk, dialing a particular three digit number to conduct the coin relay test, depositing a coin and waiting for the CO to generate a predetermined number of beeps after the test circuit returns the coin.

Responsively to the dialed test code, the CO senses minute current flow to confirm the initial coin deposit. When the coin needs to be collected or returned, a 130 V voltage is applied to the tip line, at positive or negative levels to energize the relay for collecting or returning the coin.

However, only one test trunk is typically available for each CO. Thus, if a number of repair personnel are in the field, long delays may be experienced by each repair person attempting to access the test trunk if other personnel are simultaneously attempting to access the same trunk. Such delays may result in various coin operated units remaining untested, in additional time and thus expenses for repair and maintenance, and in loss of revenue from inoperative and uncorrected coin units.

Although a number of prior art methods are known for testing coils, such methods suffer from the above described deficiencies. Thus, in Stokes U.S. Pat. No. 3,496,300 assigned to Bell Telephone Laboratories, Inc., there is described a method for remote testing of a coin relay of a coin telephone by applying particular signals to the ring and tip leads to activate various contacts of a tuned reed relay. The voltage levels on the ring and tip leads are then monitored to determine proper operation of the coin relay, as well as other aspects of a coin telephone.

Other prior art tests for relays are generally known, including application of flux by calibrated coils and counting of pulses generated by movement of a reed switch blade. Alternatively, flux is applied to a relay and the quantity of flux needed to activate a reed switch is noted. In still another approach, a coil in the relay supply line detects the counterelectromotive-force caused by movement of a relay activated arm. The coil pulses a transistor to enable passage of a control signal, thereby controlling timing of controls.

However, none of the prior art addresses or solves a problem of locally determining the operational condition of a coin relay in a coin telephone, without accessing voltages on tip and ring lines and without accessing a test trunk of the CO.

There is thus a need in the prior art for a method and apparatus for testing coin relays without incurring the presently experienced delays in accessing a test trunk of a central office.

There is a more particular need in the prior art to eliminate the requirement for accessing the test trunk of the CO merely to test the operating condition of a coin relay.

DISCLOSURE OF INVENTION

It is accordingly an object of the present invention to overcome the difficulties of the prior art and to provide a method end apparatus for locally testing a coin relay of a coin telephone without requiring access to the test trunk of the CO.

It is a more general object of the invention to test a condition of a relay coil by determining a duration of a time period between two conditions of flux generated by the coil in operation.

It is a more specific object of the invention to test a condition of coin relay by determining the duration of a time period between two conditions (e.g., expansion and collapse) of a flux field generated thereby, utilizing a non-invasive measurement technique wherein a coil detects the flux conditions, a counter counts the number of cycles of a signal output by an oscillator, and the count is converted to an output indication by an annunciator of whether the timing arrangement of the relay is too long, too short, or within specification.

Yet another object of the invention is to provide an audible annunciator, generating a sequence of output signals indicative of whether the condition of the coil being tested is to one or another side of nominal specification or within specification, thereby directing repair personnel as to the nature of needed corrective action, if any.

Still another object of the invention is the repetition of a sequence of output signals generated by an annunciator, representative of the time duration between two detected conditions of flux of a coil being tested, thereby to provide repeated indications to repair personnel as to the nature of an adjustment necessary to bring a coil to within nominal operational specifications.

In accordance with the invention, there is provided a testing apparatus for a coin relay of a coin telephone, including a flux responsive arrangement for determining the duration of a time period between a flux expansion and a flux collapse caused by operation of the coin relay. Advantageously, the flux responsive arrangement is operable within the vicinity of and external to a coin operated telephone incorporating the coin relay. In the testing apparatus there is also provided an annunciator, responsive to the flux responsive arrangement, for indicating whether the determined duration of the time period is too long, too short, or within a designed value therefor. The structure of the testing apparatus, including the flux responsive arrangement and the annunciator, is housed in a portable housing therefor.

In the relay testing apparatus of the invention, the flux responsive arrangement includes a pulse generator for generating pulses indicative of changes in the flux generated by the relay being tested.

The pulse generator preferably includes an inductive coil for sensing flux caused by the relay, the inductive coil operable for generating a voltage pulse in response to sensing a change in flux generated by the relay. Additionally, a pulse shaping circuit is provided for shaping the pulse waveform to provide substantially flat voltage pulses corresponding to the changes in flux.

Preferably, the flux responsive arrangement further includes a timing circuit for determining the duration of the time period. The timing circuit includes an oscillator and counter responsive to a first output of the pulse generator for initiating oscillation at a predetermined frequency and for counting the number of cycles of oscillation at the frequency.

Additionally, the timing circuit includes a latch responsive to the pulse generator for accepting an output of the oscillator and counter. The latch thus provides a latched output which is representative of the number of cycles of oscillation between first and second pulses generated by the pulse generator, corresponding to the flux expansion and collapse of the relay.

The timing circuit is further responsive to a second output of the pulse generator for providing an output representative of the number of cycles between the first and second outputs of the pulse generator. The output of the timing circuit thus corresponds to the duration of time between the expansion and collapse of the flux generated by the relay.

Moreover, the annunciator includes an indicator, for indicating to repair personnel whether to increase, decrease, or to leave unchanged a timing adjustment for the relay. The indicator preferably includes a parallel-to-serial converter for converting a parallel representation of the timing circuit output to a serial sequence including predetermined numbers of indications, thereby indicating to the repair personnel by the number of indications whether to increase, decrease, or leave unchanged the timing adjustment for the relay.

A coding arrangement is responsive to a predetermined condition of the oscillator and counter for triggering the parallel-to-serial-converter to input the timing circuit output in order to provide the sequence of indications to the repair personnel. As further provided in the inventive structure, the indicator includes a repeating circuit for repeatedly providing the indication to the repair personnel.

Preferably, the repeating circuit is formed using the parallel-to-serial converting recycling shift register. Therein, a parallel representation of the timing circuit output is converted to a serial sequence of predetermined numbers of indications, for indicating to the repair personnel by the number of indications whether to increase, decrease, or leave unchanged the timing adjustment for the relay.

The annunciator includes audible output generating means, responsive to an output of the recycling shift register, for providing a sequence of audible outputs to the repair personnel. A circuit is provided, responsive to a predetermined condition of the oscillator and counter, for triggering the recycling shift register to input the timing circuit output in order to provide repeating serial sequences of the indications to the repair personnel.

In accordance with another facet of the invention, there is generally provided a portable flux sensitive relay testing apparatus, including a flux responsive arrangement for determining a condition of the relay by determining a duration of a time period between first and second conditions of an electromagnetic flux field caused by operation of the relay. The flux responsive arrangement is operable within the vicinity of and external to a structure incorporating the relay. An annunciator is responsive to the flux responsive arrangement foc providing an indication of the duration of the time period between the first and second conditions of flux; and a portable housing means is provided for the flux responsive arrangement and the annunciator.

The portable flux sensitive relay testing apparatus is generally structured as recited for the coin relay tester.

In accordance with yet another feature of the invention, there is provided a method for testing a condition of a coin relay in a coin telephone. The inventive method includes the steps of detecting first and second flux conditions generated by operation of the relay. A duration is determined for a time period between the first and second conditions of flux, and an indication is provided of whether the determined duration is within a predetermined range therefor.

Preferably, the determining step includes the further steps of determining whether the duration of the determined time period is longer than the predetermined range and determining whether the duration of the determined time period is shorter than the predetermined range. The providing step includes the step of indicating whether the determined duration is within the predetermined range, is shorter than the predetermined range, or longer than the predetermined range.

The providing step more particularly includes the step of providing a number of audible indications, wherein the number of audible indication is indicative of whether the determined duration is within the predetermined range therefor. The audible, or other, indications may preferably be repeated.

Other objects, features and advantages of the present invention will become readily apparent to those skilled in the art from the following description wherein there is shown and described a preferred embodiment of the invention, simply by way of illustration and not of limitation of one of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of the present invention and, together with the description, serve to explain the principles of the invention. In the drawings:

FIG. 1 is a block diagram showing the invention from a broad perspective; and

FIG. 2 is a detailed circuit diagram, illustrating the preferred embodiment of the invention.

DETAILED DESCRIPTION OF A PREFERRED EMBODIMENT OF THE INVENTION

Referring now to FIG. 1, the inventive apparatus is broadly shown to include a flux responsive portion 100 and an annunciating portion 200. The flux responsive portion 100 includes a flux sensing arrangement 10, a pulse waveshaping circuit 20, a counting arrangement 30, and a coding arrangement 40. The annunciating portion 200 includes a control section 50, responsive to the coding arrangement of the flux responsive portion 100 and an output section 60, which may include any type of annunciating device.

In operation, the flux sensing arrangement 10 of flux responsive portion 100 detects flux levels generated by the relay under test. The pulse waveshaping circuit 20 shapes the pulses generated by flux sensing arrangement 10, and counting arrangement 30 is used to count the number of cycles of an oscillator oscillating at a predetermined frequency. The counting arrangement, which is triggered upon detection of the first flux condition of the relay under test, thus provides an output count at a later time which represents the time duration following detection of the first flux condition.

The inventive embodiment thus provides a second pulse upon detection of the second flux condition generated by the coin relay being tested and counts the number of cycles between the first and second pulses. Towards that end, the counting arrangement 30 includes a latch which, upon being triggered by a pulse representing the second flux condition, latches and retains the count of the counter at that time. The output of the latch is then encoded by coding arrangement 40 and provided to control section 50 of the annunciating portion 200.

Control section 50 converts the coded signals representing the count of counting arrangement 30 to signals for driving the output section 60 of the annunciating portion 200. Thus, particular signals are generated by the present arrangement to indicate the time between particular flux conditions of the coin relay being tested.

To understand operation of the arrangement of FIG. 1, reference is now made to the detailed description of the preferred embodiment of the invention, as shown in FIG. 2. As seen in the Figure, the flux sensing arrangement 10 is formed of a sensing coil L1, which may be an inductor. The sensing coil L1 is used to sense the flux levels and changes therein, as generated by the coin relay being tested. Accordingly, other devices, such as a commonly known Hall-effect device, which responds to appropriate levels of flux density and polarity by closing a switch, may also be used as the sensing coil L1 in FIG. 2.

The sensing coil L1, used as a secondary of a transformer, for example, may be a standard reed switch relay, having a 1K-ohm winding. For use in the present embodiment, the contacts of the reed switch are not needed. Of course, a specially designed sensing coil may also be used.

Upon detection by coil L1 of the first flux condition generated by the coin relay being tested, a voltage spike is generated by the coil. However, the voltage spike is ragged, does not have "square" edges, and generally may be prone to causing errors in circuits designed for sensing well formed digital voltages. Accordingly, the waveshaping circuit 20 is provided.

As seen in FIG. 2, waveshaping circuit 20 includes a transistor 22, receiving at the input thereof the ragged voltage spike generated by coil L1. The received spike is sufficient at its positive half to turn ON the NPN transistor 22. Of course, a negative portion of the voltage spike would turn ON a PNP transistor, so that a transistor of either conductivity may be used. Upon turning ON, NPN transistor 22 provides a negative going output pulse, which is TTL compatible, to trigger a first monostable circuit 24, connected as a monopulser providing an output pulse of predetermined duration.

Monostable circuit 24 may be an integrated circuit chip, such as generally available under the type designation 4538. The output pulse of monostable circuit 24 is a "clean" pulse, having well defined rising and falling edges and well defined output levels.

The output of monostable circuit 24 is used to trigger a counter 32. A free running RC oscillator circuit 34 is provided for determining a predetermined oscillating frequency for the counter. Although the counter is shown as a 6-bit counter, it should be appreciated that any counter may be used. At any rate, only a portion of the counts which may be generated by counter 32 are used as counts by the remaining circuitry hereof. It should be noted that the most significant bit (MSB) of the output count, output on line 35 of the counter 32, is connected to a reset input of the counter, thereby to cause the counter to reset upon attaining a count sufficiently high to cause the MSB on line 35 to transition.

Upon resetting, counter 32 causes all output bits thereof to switch to a high output level. Thus, upon counting the first count of oscillator 34, the MSB on line 35 undergoes a transition. As will be understood from the further description herein, the transitions of line 35 are also used to select a value of the count to be coded by coding arrangement 40, as well as to clock the control section 50 to accept the coded output of coding arrangement 40.

A latch 36 is connected to receive the outputs of counter 32. Latch 36 is triggered by the output pulse of monopulser 24. However, the input voltage levels to latch 36 are all high, as previously described, since the counter 32 is initiated to a reset condition. Nonetheless, since the MSB on line 3S is used to block encoding of the output of latch 36, the inventive circuit avoids a necessity for providing a further control generating circuit. Towards that goal, the MSB is inverted by an inverter 38 and inputted to the IN control pin of a three-line-to-eight-line decoder 42.

Thus, upon receiving the first pulse from pulse generating circuit 20, counter 32 is triggered into operation, the output lines thereof are all set to zero (low), and stored by latch 36 which is also triggered by the same first pulse. However, the output of latch 36 is not decoded by decoder 42 since the IN control pin thereto is deactivated at the time of the first pulse, due to the high level of the MSB on line 35. Oscillator 34 continues to oscillate and counter 32 continues to count the pulses thereof.

However, upon receipt of the next pulse from pulse generating circuit 20, output line 35 of counter 32 will have dropped, and the inverted form thereof output by inverter 38 will be high, thus enabling input of the output of latch 36 to decoding circuit 42 at that time. Accordingly, upon detection by coil L1 of the second flux condition of the relay being tested, the second pulse is outputted by monopulser 24 to counter 32 and to latch 36. The second pulse has no effect on the counter, but causes the count thereof to be latched by latch 36 and to be input to decoder 42.

Accordingly, one of the eight output lines of the decoder will transition to a low logic level, depending on the count in latch 36. The specific output line activated at the output of decoder 42 is thus indicative of whether the duration of the time period counted by counter 32 is within the required range therefor, is too long, or too short. Accordingly, there is provided the encoding arrangement at 40, wherein a plurality of diodes are used to activate particular ones of a plurality of input lines to control section 80, in order to cause output section 60 to provide appropriate indications of the quality of the relay being tested. That is, output section 60 is arranged to provide a particular indication to repair personnel, for example, as a function of the set of input lines to section 50 which have been activated by diode encoding arrangement 40.

The control section 50 is preferably comprised of a parallel-to-serial converting shift register 52, of the type commercially available under the designation 4014, for example. By arranging four of the input lines 54 to the shift register to be connected to a high voltage level, the number of low inputs on the four remaining input lines is used to determine the number of low outputs in a serial sequence provided on output line 56.

It will be noted that when output line 56 is at a low level, a beeper 62 and a LED 64 are activated. Thus, for a particular arrangement of voltage levels on the parallel input lines 54, the shift register 52 will provide a particular sequence of output low levels, and the output section will provide a sequence of audible beeps and visible light indications.

In order to make the output annunciations more easily discernible by repair personnel, the specific condition of the relay under test, represented by the specific output count of counter 32 and thus by the particular output line of decoder 42, is converted to a predetermined number of input low levels to shift register 52.

Since the output count of counter 32 will typically be within a small number of counts of an expected count, only the three low order output lines thereof, representing the three least significant bits of the count, are decoded by decoder 42. If the count is high enough to be represented by an output on output line 39 thereof, a direct connection is provided to one of the input lines 54 of shift register 52, thus providing a single low level input thereto representative of an "out of range" condition. Accordingly, upon conversion of the parallel input signals to a serial sequence, shift register 52 activates LED 64 and beeper 62 to provide a single flash and a single beep to indicate an out of range condition of the relay under test.

It should be noted that an output signal on output line 39 is provided to the INHIBIT input of latch 36, thus assuring that none of the outputs of latch 36 will be active. Accordingly, when line 39 is activated, only a single one of the inputs to shift register 52 will receive a low level input.

For counts lower than the "out of range" value, represented by signals on the three least significant bits of the count in counter 32, latch 36 is activated by the output of inverter 38, as previously mentioned. One of the eight output lines of the latch circuit is activated.

When the count is too low, i.e., the time duration between the two detected flux conditions is too short, requiring one type of adjustment by the repair personnel, output line 43 is activated. While line 43 itself would cause only a single output flash and beep to be generated, the encoding diodes 40 cause an output on line 43 to lead to two beeps and flashes. Thus, repair personnel are alerted to a requirement for the first type of adjustment by two beeps, or two flashes.

If the count is within the prescribed range therefor, representing a nominal time duration for the flux conditions of the relay under test, either of output lines 44 is caused to be activated. These lines are directly connected to the annunciating arrangement of output section 60, to provide a steady beep or steady illumination of the LED. Accordingly, repair personnel are informed of nominal operation of the relay by the steady illumination or steady beeping condition.

If the count representing the duration of the time period is slightly too high, representing a slightly overlong time period, output line 45 is activated. Encoding section 40 causes three of the input lines 54 to shift register 52 to be activated, thus providing three output beeps and flashes. Thus, repair personnel are alerted to a second type of adjustment by the three audible beeps and by the three flashes of the LED.

Where the count is much higher than the proper range therefor, and any of output lines 46 of the decoder 42 are activated, the encoding diodes 40 cause four beeps and flashes to be generated, thus alerting the repair personnel to the necessity for significant adjustments of the second type, to shorten the time period between the flux changes generated by the relay.

Of course, different count values may be used to generate different output signals and the different signals may represent different conditions, without departing from the inventive concept hereof.

As will be noted from FIG. 2, the output line 56 of the shift register 52 is fed back to a serial input thereof, thus providing recycling operation wherein the sequence of output signals is repeatedly generated. Accordingly, repair personnel are alerted to the specific condition of the relay under test by a repeating number of beeps and/or flashes. It will also be noted that the four parallel inputs of the shift register which are activated to generate the desired output signals are alternate input lines. Thus, it is possible to distinguish between audible beeps of successive cycles. Moreover, a standard oscillating circuit is provided at 66, with a buffer, for clocking shift register 52.

Reference is now made to a second monostable circuit, shown at 68, which is generally of the same type as first monostable circuit 24. When counter 32 overflows to RESET, monostable 68 responds thereto by generating a long pulse, which may be in the range of 300 to 500 ms, for example, for triggering shift register 52.

The shift register, which requires a pulse having a duration longer than one bit time for loading the input parallel bits, is thus operably triggered. Indeed, for the particular shift register used in the present circuit, in order to load the input bits a high level input voltage is required at the PE input thereof during a transition of the clock signal input from clocking circuit 66. However, the input is then required to drop to a low level to permit circulation of the shift register contents. Monostable circuit 68 thus provides the appropriate signals to the shift register.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

What is claimed is:

1. Coin telephone relay testing apparatus comprising:
   flux responsive means for determining a duration of a time period between a flux expansion and a flux collapse caused by operation of a coin relay under test;
   said flux responsive means operable within the vicinity of and external to a coin operated telephone apparatus incorporating the coin relay under test;
   annunciator means responsive to the flux responsive means for indicating whether the determined duration of the time period is too long, too short, or within a designed value therefor; and
   portable housing means for said flux responsive means and said annunciator means.

2. A coin telephone relay testing apparatus as recited in claim 1 wherein said flux responsive means comprises pulse generating means for generating pulses indicative of changes in flux generated by the relay under test.

3. A coin telephone relay testing apparatus as recited in claim 2 wherein said pulse generating means comprises inductive coil means for sensing flux caused by the relay under test, said inductive coil means operable for generating a voltage pulse in response to sensing a change in flux generated by the relay under test, and
   pulse shaping means for shaping a waveform to provide substantially flat voltage pulses corresponding to said changes 4. A coin telephone relay testing apparatus as recited in claim 2 wherein said flux responsive means further comprises time determining means for determining said duration of said time period,
   said time determining means including oscillating and counting means responsive to a first output of said pulse generating means for initiating oscillation at a predetermined frequency and for counting the number of cycles of oscillation at said frequency.

5. A coin telephone relay testing apparatus as recited in claim 4, said time determining means further comprising latching means responsive to said pulse generating means for accepting an output of said oscillating and counting means and for providing a latched output representative of the number of cycles of oscillation at said frequency between first and second pulses generated by said pulse generating means corresponding to said flux expansion and collapse of the relay under test.

6. A coin telephone relay testing apparatus as recited in claim 4 wherein said time determining means is further responsive to a second output of said pulse generating means for providing an output representative of a count of the number of cycles of oscillation at said frequency between said first and second outputs genereted by said pulse generating means,
   said time determining means output corresponding to the duration of time between said flux expansion and collapse of the relay under test.

7. A coin telephone relay testing apparatus as recited in claim 6 wherein said annunciator means comprises means for indicating to repair personnel whether to increase, decrease, or leave unchanged a timing adjustment for the relay under test.

8. A coin telephone relay testing apparatus as recited in claim 7 wherein said means for indicating comprises parallel-to-serial converting means for converting a parallel representation of said time determining means output to a serial sequence of predetermined numbers of indications, thereby indicating to the repair personnel by the number of indications whether to increase, decrease, or leave unchanged the timing adjustment for the relay under test.

9. A coin telephone relay testing apparatus as recited in claim 8 further comprising means responsive to a predetermined condition of said oscillating and counting means for triggering said parallel-to-serial-converting means to input said time determining means output for conversion to serial to provide said sequence of indications to the repair personnel.

10. A coin telephone relay testing apparatus as recited in claim 7 wherein said means for indicating comprises repeating means for repeatedly providing said indication to the repair personnel.

11. A coin telephone relay testing apparatus as recited in claim 10 wherein said repeating means of said means for indicating comprises parallel-to-serial converting recycling shift register means for converting a parallel representation of said time determining means output to a serial sequence of predetermined numbers of indications, thereby indicating to the repair personnel by the number of indications whether to increase, decrease, or leave unchanged the timing adjustment for the relay under test.

12. A coin telephone relay testing apparatus as recited in claim 11 wherein said annunciator means comprises audible output means responsive to an output of said recycling shift register means for providing a sequence of audible outputs to the repair personnel.

13. A coin telephone relay testing apparatus as recited in claim 11 further comprising means responsive to a predetermined condition of said oscillating and counting means for triggering said recycling shift register means to input said time determining means output for conversion to serial to provide repeating serial sequences of said indications to the repair personnel.

14. Portable flux sensitive relay testing apparatus comprising: flux responsive means for determining a condition of the relay under test by determining a duration of a time period between first end second conditions of an electromagnetic flux field caused by operation of the relay under test;

said flux responsive means operable within the vicinity of and external to apparatus incorporating the relay under test; annunciator means responsive to the flux responsive means for providing an indication of said duration of the time period between said first and second conditions of flux; and portable housing means for said flux responsive means and said annunciator means.

15. A portable flux sensitive relay testing apparatus as recited in claim 14 further comprising quality detecting means operable for determining whether the determined duration of the time period is too long, too short, or within a designed value therefor and wherein said annunciator means comprises duration annunciating means responsive to said quality detecting means and operable for annunciating whether the determined duration of the time period is too long, too short, or within a designed value therefor.

16. A portable flux sensitive relay testing apparatus as recited in claim 15 wherein said flux responsive means comprises pulse generating means for generating pulses indicative of flux conditions generated by the relay under test.

17. A portable flux sensitive relay testing apparatus as recited in claim 16 wherein said flux responsive means further comprises time determining means for determining said duration of said time period, said time determining means including oscillating and counting means responsive to a first output of said pulse generating means for initiating oscillation at a predetermined frequency and for counting the number of cycles of oscillation at said frequency.

18. A portable flux sensitive relay testing apparatus as recited in claim 17, said time determining means further comprising latching means responsive to said pulse generating means for accepting an output of said oscillating and counting means and for providing a latched output representative of the number of cycles of oscillation at said frequency between first and second pulses generated by said pulse generating means corresponding to said first and second flux conditions of the relay under test.

19. A portable flux sensitive relay testing apparatus as recited in claim 17 wherein said time determining means is further responsive to a second output of said pulse generating means for providing an output representative of a count of the number of cycles of oscillation at said frequency between said first and second outputs generated by said pulse generating means, said time determining means output corresponding to the duration of time between said first and second conditions of flux of the relay under test.

20. A portable flux sensitive relay testing apparatus as recited in claim 19 wherein said duration annunciating means comprises means for indicating to repair personnel whether to increase, decrease, or leave unchanged a timing adjustment for the relay under test.

21. A portable flux sensitive relay testing apparatus as recited in claim 20 wherein said means for indicating comprises parallel-to-serial converting means for converting a parallel representation of said time determining means output to a serial sequence of predetermined numbers of indications, thereby indicating to the repair personnel by the number of indications whether to increase, decrease, or leave unchanged the timing adjustment for the relay under test.

22. A portable flux sensitive relay testing apparatus as recited in claim 21 further comprising means responsive to a predetermined condition of said oscillating and counting means for triggering said parallel-to-serial-converting means to input said time determining means output for conversion to serial to provide said sequence of indications to the repair personnel.

23. A portable flux sensitive relay testing apparatus as recited in claim 20 wherein said means for indicating comprises repeating means for repeatedly providing said indication to the repair personnel.

24. A portable flux sensitive relay testing apparatus as recited in claim 23 wherein said repeating means of said means for indicating comprises parallel-to-serial converting recycling shift register means for converting a parallel representation of said time determining means output to a serial sequence of predetermined numbers of indications, thereby indicating to the repair personnel by the number of indications whether to increase, decrease, or leave unchanged the timing adjustment for the relay under test.

25. A portable flux sensitive relay testing apparatus as recited in claim 24 wherein said annunciator means comprises audible output means responsive to an output of said recycling shift register means for providing a sequence of audible outputs to the repair personnel.

26. A portable flux sensitive relay testing apparatus as recited in claim 24 further comprising means responsive to a predetermined condition of said oscillating and counting means for triggering said recycling shift register means to input said time determining means output for conversion to serial to provide repeating serial sequences of said indications to the repair personnel.

27. A portable flux sensitive relay testing apparatus as recited in claim 14 wherein said flux responsive means comprises a Hall-effect device.

28. A method for testing a condition of a coin relay in a coin telephone comprising:

detecting a first flux condition generated by operation of the relay under test, detecting a second flux condition generated by operation of the relay under test, determining a duration of a time period between said first and second conditions of flux, and providing an indication of whether the determined duration is within a predetermined range therefor.

29. A method as recited in claim 28 wherein said determining step comprises the further steps of determining whether the duration of the determined time period is longer than said predetermined range, determining whether the duration of the determined time period is shorter than said predetermined range, and wherein said providing step comprises the step of indicating whether the determined duration is within the predetermined range, shorter than the predetermined range, or longer than the predetermined range.

30. A method as recited in claim 28 wherein said providing step comprises the step of providing a number of audible indications, the provided number indicative of whether the determined duration is within the predetermined range therefor.

31. A method as recited in claim 30 wherein said providing step comprises the further step of repeating the number of audible indications.

* * * * *